(12) United States Patent
Lee

(10) Patent No.: US 8,778,531 B2
(45) Date of Patent: Jul. 15, 2014

(54) POUCH-TYPE LITHIUM POLYMER BATTERY AND METHOD FOR MANUFACTURING THE SAME

(75) Inventor: Hyung Bok Lee, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1277 days.

(21) Appl. No.: 11/165,594

(22) Filed: Jun. 22, 2005

(65) Prior Publication Data

US 2006/0035141 A1 Feb. 16, 2006

(30) Foreign Application Priority Data

Jun. 22, 2004 (KR) .................. 10-2004-0046670

(51) Int. Cl.
*H01M 2/02* (2006.01)
(52) U.S. Cl.
CPC ............ *H01M 2/0207* (2013.01); *H01M 2/021* (2013.01)
USPC .......................................... 429/185; 429/175
(58) Field of Classification Search
CPC ................................ H01M 2/021; H01M 2/34
USPC .......................................... 429/127, 185, 175
See application file for complete search history.

(56) References Cited

U.S. PATENT DOCUMENTS

| | | | |
|---|---|---|---|
| 6,387,567 B1 | 5/2002 | Noh | |
| 6,451,474 B1 | 9/2002 | Kozu et al. | |
| 6,822,420 B2 | 11/2004 | Kozu et al. | |
| 6,861,821 B2 | 3/2005 | Masumoto et al. | |
| 6,994,926 B2 | 2/2006 | Ikeuchi et al. | |
| 7,169,505 B2 * | 1/2007 | Gu ................................ 429/129 |

(Continued)

FOREIGN PATENT DOCUMENTS

| | | |
|---|---|---|
| CN | 2268313 | 11/1997 |
| CN | 1322026 | 11/2001 |

(Continued)

OTHER PUBLICATIONS

English Translation of JP 2003-303580.*
English Translation of JP 2003-017015.*
Patent Abstracts of Japan for Publication No. 2004-165457; Date of publication of application Jun. 10, 2004, in the name of Seiji Ioka et al.

(Continued)

*Primary Examiner* — Milton I Cano
*Assistant Examiner* — Stephen Yanchuk
(74) *Attorney, Agent, or Firm* — Christie, Parker & Hale, LLP

(57) ABSTRACT

Pouch-type lithium polymer batteries and a methods for manufacturing them are disclosed. One such battery comprises a wound electrode assembly comprising positive and negative electrode plates and a separator. Positive and negative electrode tabs are attached to the positive and negative electrode plates and extend from the electrode assembly. The electrode assembly is encased within a pouch which comprises a cavity and a cover. The positive and negative electrode tabs extend outside the pouch. A protective circuit module is electrically connected to the positive and negative electrode tabs and is molded with, or encased in a resin to form a protective circuit construction which is positioned against a front surface of the pouch. The pouch-type lithium polymer batteries of this invention can be used in external apparatuses such as laptop computers or PDAs. The protective circuit constructions of this invention are not short-circuited to external circuits of the external apparatuses.

8 Claims, 24 Drawing Sheets

(56) References Cited

U.S. PATENT DOCUMENTS

| | | | |
|---|---|---|---|
| 2002/0039283 A1 | | 4/2002 | Nakamura et al. |
| 2003/0099880 A1 | | 5/2003 | Park et al. |
| 2003/0165736 A1 | | 9/2003 | Hiratsuka |
| 2003/0180582 A1 | * | 9/2003 | Masumoto et al. ............... 429/7 |
| 2004/0099367 A1 | * | 5/2004 | Nakamura et al. ............ 156/182 |
| 2004/0234848 A1 | * | 11/2004 | Chung et al. .................. 429/181 |
| 2005/0112456 A1 | | 5/2005 | Kozu et al. |
| 2005/0151514 A1 | * | 7/2005 | Kozu et al. .................... 320/147 |
| 2006/0051668 A1 | | 3/2006 | Chung et al. |
| 2006/0068275 A1 | | 3/2006 | Chung et al. |
| 2006/0068281 A1 | * | 3/2006 | Hiratsuka et al. ............. 429/185 |

FOREIGN PATENT DOCUMENTS

| | | | |
|---|---|---|---|
| CN | 1323075 | | 11/2001 |
| CN | 1395326 A | | 2/2003 |
| JP | 2000-173576 A | | 6/2000 |
| JP | 2000-173580 A | | 6/2000 |
| JP | 2000-311713 A | | 11/2000 |
| JP | 2002-203534 A | | 7/2002 |
| JP | 2003-142054 | | 5/2003 |
| JP | 2003-257413 | | 9/2003 |
| JP | 2003-303580 | | 10/2003 |
| JP | 2004-165457 | | 6/2004 |
| KR | 2000-0038817 | | 7/2000 |
| KR | 2002-0074550 | | 3/2001 |
| WO | WO 01/69699 A1 | | 9/2001 |
| WO | WO 01/99211 A1 | | 12/2001 |
| WO | WO 03/003485 A1 | | 1/2003 |
| WO | WO-03/081695 | * | 2/2003 |

OTHER PUBLICATIONS

SIPO Certificate of Patent No. ZL200410033441 issued on Jul. 22, 2009 for the corresponding Chinese patent application to related U.S. Appl. No. 10/791,269, listing the CN references, 14 pps.

U.S. Office Action dated Jul. 7, 2009 issued in related U.S. Appl. No. 10/791,269, listing the KR reference, 9.

U.S. Office Action dated Nov. 20, 2009 issued in related U.S. Appl. No. 10/791,269.

U.S. Office Action dated May 26, 2010 issued in related U.S. Appl. No. 10/791,269.

Office action cited in U.S. Appl. No. 10/791,269 dated Jul. 16, 2007, 8 pages.

Office action cited in U.S. Appl. No. 10/791,269 dated Nov. 26, 2007, 9 pages.

Office action cited in U.S. Appl. No, 10/791,269 dated May 23, 2008, 7 pages.

Office action cited in U.S. Appl. No. 10/791,269 dated Oct. 8, 2008, 7 pages.

Office action cited in U.S. Appl. No. 10/791,269 dated Feb. 17, 2009, 8 pages.

Office action cited in U.S. Appl. No. 10/791,269 dated Oct. 15, 2010, 8 pages.

U.S. Office action dated Mar. 23, 2011, for cross reference U.S. Appl. No. 10/791,269, (14 pages).

U.S. Office action dated Aug. 17, 2011, for cross reference U.S. Appl. No. 10/791,269, (10 pages).

U.S. Office action dated Jan. 12, 2012, for cross reference U.S. Appl. No. 10/791,269, (17 pages).

* cited by examiner

POUCH-TYPE LITHIUM POLYMER BATTERY AND METHOD FOR MANUFACTURING THE SAME

CROSS REFERENCE TO RELATED APPLICATION

This application claims priority to and the benefit of Korean Patent Application number 2004-0046670, filed Jun. 22, 2004 in the Korean Intellectual Property Office, the entire content of which is incorporated herein by reference.

FIELD OF THE INVENTION

The present invention relates to a pouch-type lithium polymer battery and a method for manufacturing the same. More particularly, the present invention is directed to a pouch-type lithium polymer battery having a protective circuit module molded with, or encased in a resin to prevent the battery from short-circuiting to an external circuit.

BACKGROUND OF THE INVENTION

Lithium polymer batteries comprise electrode assemblies comprising separators positioned between positive and negative electrode plates. The separator acts as a medium for ion conduction, similar to an electrolyte. The separator also performs separation in the lithium ion battery. These separators generally comprises gel-type polymer electrolytes formed by impregnating polymers with an electrolyte for improved ion conductivity.

Lithium polymer batteries are generally encased in thin pouches and sealed to reduce the risk of leakage of the gel-type electrolyte. The pouch comprises a thin metallic foil having two surfaces, one surface coated with cast polypropylene, and the other surface coated with vinyl.

Lithium polymer batteries generally have protective circuit modules fastened to predetermined regions of the pouches. The protective circuit modules protect the batteries from voltages and currents generated during overcharge, over-discharge, short circuits, and the like. The protective circuit modules are typically connected to the electrode assemblies by positive and negative electrode tabs which extend a predetermined length from the exterior of the pouch. Various semiconductor devices and passive devices are mounted on the protective circuit modules to sense voltages and currents during overcharge, over-discharge, short circuits, and the like. These devices include comparative circuits, logic circuits, and field effect transistors for charge/discharge switches.

When external apparatuses such as laptop computers and PDAs are equipped with these conventional lithium polymer batteries, the protective circuit module may be directly short-circuited to the peripheral circuit of the external apparatus. More particularly, the wiring pattern of the semiconductor devices mounted on the protective circuit module may be short-circuited to the peripheral circuit of the external apparatus. Such short circuits cause battery malfunction and may damage the external apparatus.

The electrode tabs of conventional lithium polymer batteries are generally "U" or "Z" shaped. The electrode tabs are electrically connected to the protective circuit module to suppress any increase in battery thickness caused by the protective circuit module. More specifically, the protective circuit module is positioned on an additional pouch in front of the electrode assembly. The electrode tabs are bent several times to achieve a "U" or "Z" shape, and are connected to the protective circuit module. Accordingly, conventional lithium polymer batteries require numerous processing steps for mounting the protective circuit module and comprise complicated exteriors. These conventional lithium polymer batteries are also quite long because the protective circuit module is positioned in front of the electrode assembly pouch.

SUMMARY OF THE INVENTION

In one embodiment of the present invention, a pouch-type lithium polymer battery comprises a protective circuit module molded with, or encased in a resin to prevent the module from short-circuiting to an external circuit. In another embodiment, the invention is directed to a method for manufacturing a pouch-type lithium polymer battery comprising a protective circuit module molded with, or encased in a resin.

In an alternative embodiment, the invention is directed to a lithium polymer battery having fewer manufacturing processes and a simplified exterior. The lithium polymer battery can also comprise a protective circuit module suitable for large-capacity batteries.

An exemplary pouch-type lithium polymer battery comprises an electrode assembly having a positive electrode plate, a separator, and a negative electrode plate. The positive and negative electrodes plates and the separator are laminated and then wound numerous times to form the electrode assembly. Positive and negative electrode tabs extend a predetermined length from the exterior of the electrode assembly and are connected to the positive and negative electrode plates, respectively. The electrode assembly is contained within a pouch which comprises a cavity having a depth suitable for containing the electrode assembly. The pouch further comprises a cover for covering the cavity. The positive and negative electrode tabs extend a predetermined length from the exterior of the cavity and the cover. A protective circuit construction comprising a protective circuit module is positioned on the exterior of the pouch, is encased in a resin, and is electrically connected to the positive and negative electrode tabs.

The protective circuit construction is formed by molding a protective circuit module with a resin and bending the positive and negative electrode tabs. The protective circuit is molded and the electrode tabs are bent such that a portion of the resin adheres to a surface of the pouch. Alternatively, the protective circuit construction is formed by positioning a protective circuit module in a case and bending the positive and negative electrode tabs.

In another embodiment, a method for manufacturing a pouch-type lithium polymer battery comprises first preparing a pouch comprising a cavity and a cover, wherein the cavity and the cover are adapted to be folded together. The cavity has a predetermined depth suitable for containing an electrode assembly. The electrode assembly comprises a positive electrode plate, a separator and a negative electrode plate. The positive electrode plate, the separator and the negative electrode plate are laminated and then wound numerous times to form the electrode assembly. Positive and negative electrode tabs extend a predetermined length from the exterior of the electrode assembly, and are connected to the positive and negative electrode plates. The cavity and cover of the pouch are then thermally bonded such that the positive and negative electrode tabs remain exposed, extending a predetermined length from the exterior of the pouch. A protective circuit module is then connected to the positive and negative electrode tabs extending from the exterior of the pouch. The protective circuit module is then encased in a resin.

The pouch-type lithium polymer battery according to one embodiment of the present invention comprises a protective circuit module, which acts as a protective circuit construction. The protective circuit module is molded with, or encased in a resin to prevent it from short-circuiting to another, peripheral circuit of an external apparatus.

At least one semiconductor device and/or passive device is mounted on the protective circuit device. Each of the semiconductor and/or passive devices are molded with, or encased in a resin. Accordingly, the battery has a simplified exterior.

The positive and negative electrode tabs are bent to a "L" or "U" shape. The protective circuit construction is connected to the positive and negative electrode tabs, and is positioned upright. As a result, the protective circuit construction can be used in large-capacity lithium polymer batteries without an increase in overall battery length.

BRIEF DESCRIPTION OF THE DRAWINGS

The above and other features and advantages of the present invention will become more apparent by reference to the following detailed description when considered in conjunction with the accompanying drawings, in which:

FIG. 10B is a schematic depicting the placement of an electrode assembly within the pouch of FIG. 10a;

FIG. 11B is a schematic depicting the placement of an electrode assembly within the pouch of FIG. 11a;

FIG. 12B is a schematic depicting the placement of an electrode assembly within the pouch of FIG. 12a;

DETAILED DESCRIPTION

Figure 1:
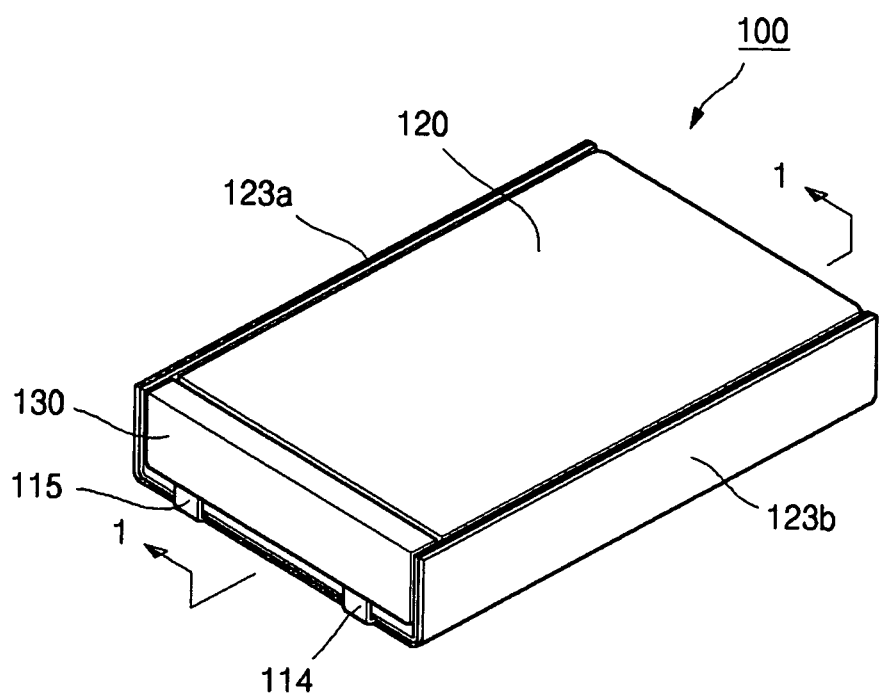
FIG. 1 is a perspective view of a pouch-type lithium polymer battery according to one embodiment of the present invention.

Exemplary embodiments of the present invention will now be described with reference to the accompanying drawings. In the following description and accompanying drawings, like reference numerals are used to designate like components in order to omit repetitive descriptions of same or similar components.

Figure 2:
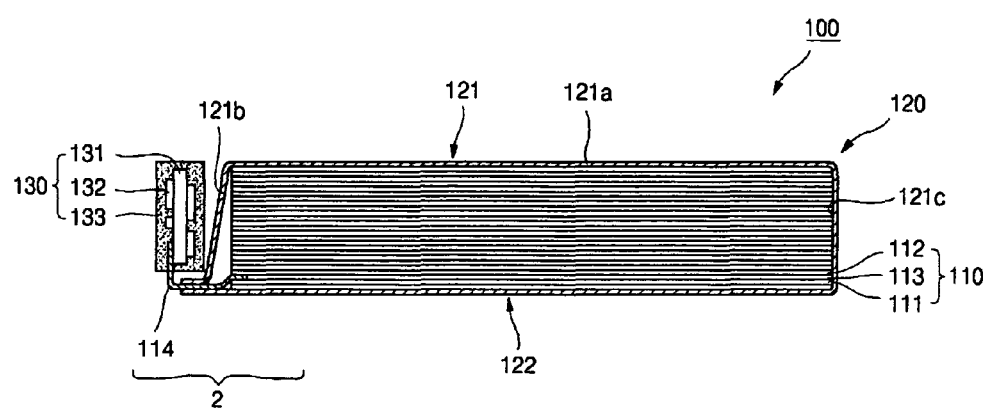
FIG. 2 is a side cross-sectional view of the battery of FIG. 1, taken along line 1-1.
Figure 3:
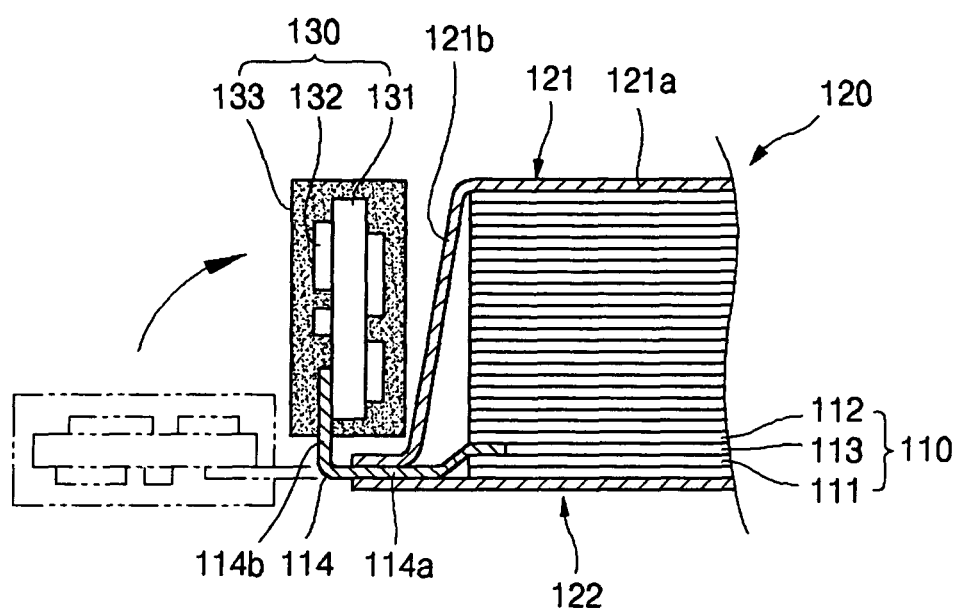
FIG. 3 is a close up side cross-sectional view of region 2 depicted in FIG. 2.

FIGS. 1 through 3 illustrate a pouch-type lithium battery 100 according to one embodiment of the present invention. Specifically, FIG. 1 is a perspective view of a pouch-type lithium polymer battery 100 according to one embodiment of the present invention. FIG. 2 is a side cross-sectional view of the battery of FIG. 1 taken along line 1-1. FIG. 3 is a close up side cross-sectional view of region 2 depicted in FIG. 2.

As shown in FIGS. 1 through 3, the pouch-type lithium polymer battery 100 generally comprises an electrode assembly 110, a pouch 120 for containing and sealing the electrode assembly 110, and a protective circuit construction 130 positioned in front of the pouch 120 in an upright position.

The electrode assembly 110 has a positive electrode plate 111, a negative electrode plate 112, and a separator 113 positioned between the positive and negative electrode plates 111 and 112, respectively. The positive and negative electrode plates 111 and 112, respectively, and the separator 113 are laminated and then wound numerous times to form the electrode assembly 110. The electrode assembly 110 further comprises a positive electrode tab 114 connected to the positive electrode plate 111, and a negative electrode tab 115 connected to the negative electrode plate 112. The positive and negative electrode tabs 114 and 115, respectively, extend a predetermined length from the exterior of the wound electrode assembly 110.

The positive electrode plate 111, negative electrode plate 112 and separator 114 may comprise any suitable material. For example, the positive electrode plate 111 may comprise an aluminum foil or mesh coated with a lithium metal oxide such as lithium cobalt oxide ($LiCoO_2$), the negative electrode plate 112 may comprise a copper foil coated with graphite, and the separator 113 may comprise a gel-type polymer electrolyte.

Similarly, the positive electrode tab 114 and negative electrode tab 115 can comprise any suitable material. For example, the positive electrode tab 114 may comprise an aluminum tab connected to the positive electrode plate 111, and the negative electrode tab 115 may comprise a nickel tab connected to the negative electrode plate 112.

As shown in FIGS. 1 through 3, the pouch 120 comprises a cavity 121 having a predetermined depth suitable to contain the electrode assembly 110. The pouch 120 further comprises a cover 122 having a surface area large enough to cover the cavity 121. The pouch 120 acts as a central layer and may comprise any suitable material, for example aluminum foil. In one exemplary embodiment, the pouch 120 is coated on one surface with cast polypropylene, and on the other surface with vinyl. However, any suitable coating materials may be used.

The cavity 121 of the pouch 120 has a bottom surface 121a, a front surface 121b and a rear surface 121c. The front and rear surfaces 121b and 121c, respectively, extend approximately perpendicular to the bottom surface 121a and both extend from the bottom surface 121a to a predetermined height to create the cavity 121. The positive and negative electrode tabs 114 and 115, respectively, are connected to the electrode assembly 110 and extend a predetermined length from the outer peripheral edge of the pouch 120. More specifically, the positive and negative electrode tabs 114 and 115, respectively, extend from the exterior of the front surface 121b of the cavity 121.

As shown in FIG. 1, the pouch 120 may further comprise lips 123a and 123b extending from the outer peripheral edges of the cavity. Once the electrode assembly 110 is inserted in the cavity 121 and covered with the cover 122, the lips 123a and 123b are folded toward the bottom surface of the cavity 121 at approximately 90°. The lips 123a and 123b are folded in this manner to minimize the battery size and to prevent the metallic foil inside the pouch 120 from directly contacting the circuit of an external apparatus. After folding, portions of the lips 123a and 123b contact the sides of the protective circuit construction 130.

The protective circuit construction 130 comprises at least one semiconductor device 132 mounted on a protective circuit module 131 for detecting voltages and currents during overcharging, over-discharging, short circuits, and the like. The at least one semiconductor device may be selected from the group consisting of integrated circuits (ICs), active devices, and passive devices. The protective circuit construction 131 further comprises at least one wiring pattern formed on the surface of the protective circuit module 132. The protective circuit construction also comprises a resin 133 which completely encases the protective circuit module 131. The resin 133 may comprise a compound selected from the group consisting of reinforced plastic compounds, flame-retardant plastic compounds, refractory plastic compounds, equivalents thereof, and mixtures thereof.

The protective circuit module 131 of the protective circuit construction 130 is connected to the positive and negative electrode plates 114 and 115, respectively, which extend from the exterior of the pouch 120. The protective circuit construction 130 is positioned parallel to the front surface 121b of the cavity 121. In sum, the protective circuit construction 130 is positioned in front of the pouch 120 in an upright position.

More specifically, the protective circuit construction 130 has a height equal to or less than a height of the front and rear surfaces 121b and 121c, respectively of the cavity 121 of the pouch 120. This ensures that the protective circuit construction 130 does not have a thickness greater than a thickness of the pouch-type lithium polymer battery 100.

The positive and negative electrode tabs 114 and 115, respectively, are connected to the protective circuit module 131 of the protective circuit construction 130 and each are then bent to approximately a "L" or "U" shape. This enables easy positioning of the protective circuit construction 130 in an upright position in front of the pouch 120. The protective circuit construction 130 is positioned substantially parallel to the front surface 121b of the cavity 121. As shown in FIG. 3, after bending, the positive electrode tab 114 includes a first region 114a located approximately parallel to the cover 122 of the pouch 120. The positive electrode tab 114 further comprises a second region 114b extending approximately perpendicular to the cover 122 of the pouch 120. Although not shown in the drawings, the negative electrode tab 115 includes similar first and second regions after bending.

Both sides of the protective circuit construction 130 directly contact the lips 123a and 123b of the pouch 120 as discussed above. However, all components of the protective circuit construction 130 are completely encased in the resin 133. The resin 133 insulates the components of the protective circuit construction 130 from the inner metallic foil of the pouch 120, thereby preventing an electric connection between the components of the protective circuit construction 130 and the inner metallic foil of the pouch 120. Therefore, the components of the protective circuit construction 130, including the protective circuit module 131, are encased in the resin 133 and cannot be directly short-circuited to the circuit of an external apparatus such as a laptop computer or a PDA. This improves the battery performance and the stability of the external apparatus.

Although not shown in the drawings, the protective circuit module 131 also comprises a lead wire extending through the resin 133 for directly connecting the module 131 to the external apparatus.

Figure 4:
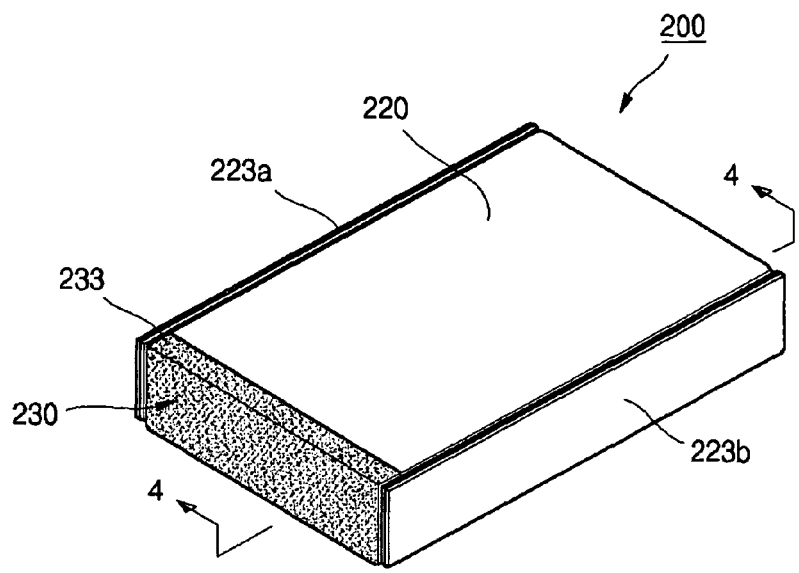
FIG. 4 is a perspective view of a pouch-type lithium polymer battery according to another embodiment of the present invention.
Figure 5:
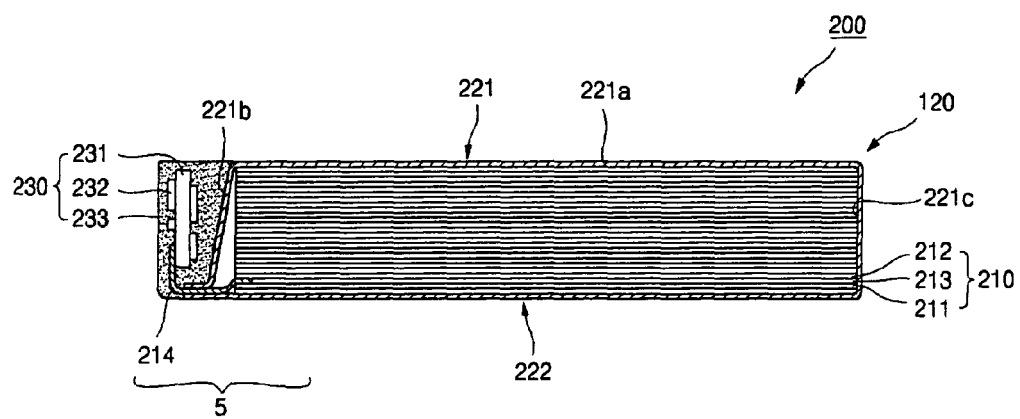
FIG. 5 is a side cross-sectional view of the battery of FIG. 4, taken along line 4-4.
Figure 6:
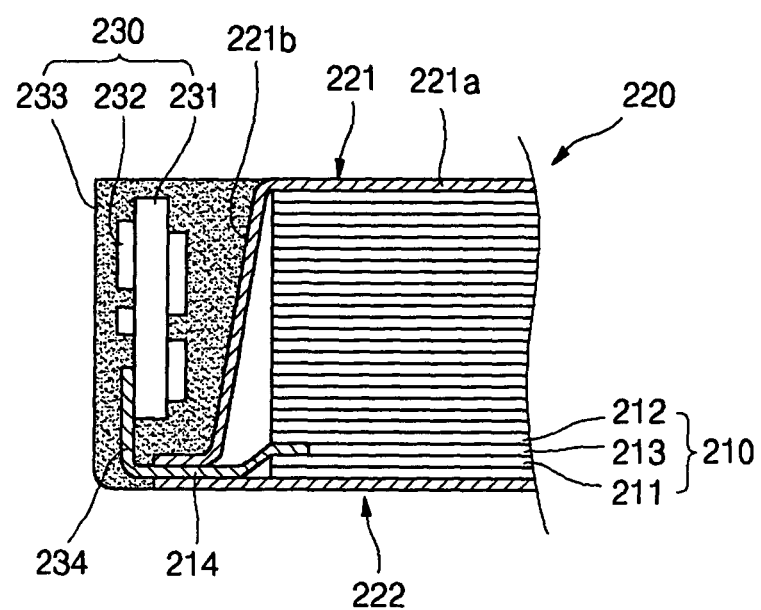
FIG. 6 is a close up side cross-sectional view region 5 depicted in FIG. 5.

FIGS. 4 through 6 illustrate a pouch-type lithium polymer battery 200 according to an alternative embodiment of the present invention. Specifically, FIG. 4 is a perspective view of a pouch-type lithium polymer battery 200 according to one embodiment of the present invention. FIG. 5 is a side cross-sectional view of the battery of FIG. 4 taken along line 4-4. FIG. 6 is a close up side cross-sectional view of region 5 depicted in FIG. 5.

The pouch-type lithium polymer battery 200 illustrated in FIGS. 4 through 6 is similar to the above-mentioned pouch-type lithium polymer battery 100 illustrated in FIGS. 1 through 3. Accordingly, only the differences between the batteries are described.

As shown in FIGS. 4 through 6, a protective circuit construction 230 comprises a protective circuit module 231 connected to a positive electrode tab 214 and a negative electrode tab (not shown). The protective circuit module 231, the positive electrode tab 214 and the negative electrode tab are encased in a resin 233 to form the protective circuit construction 230. The protective circuit construction 230 is glued or otherwise fixedly attached to a front surface 221b of a cavity 221 of a pouch 220. This protective circuit construction 230 prevents the protective circuit module 231, the positive electrode tab 214, and the negative electrode tab from short-circuiting to an external circuit. In addition, the protective circuit construction 230 is fixedly attached to the front surface 221b of the cavity 221 of the pouch 220 so that it cannot become separated from the pouch 220 by an external force.

Figure 7:
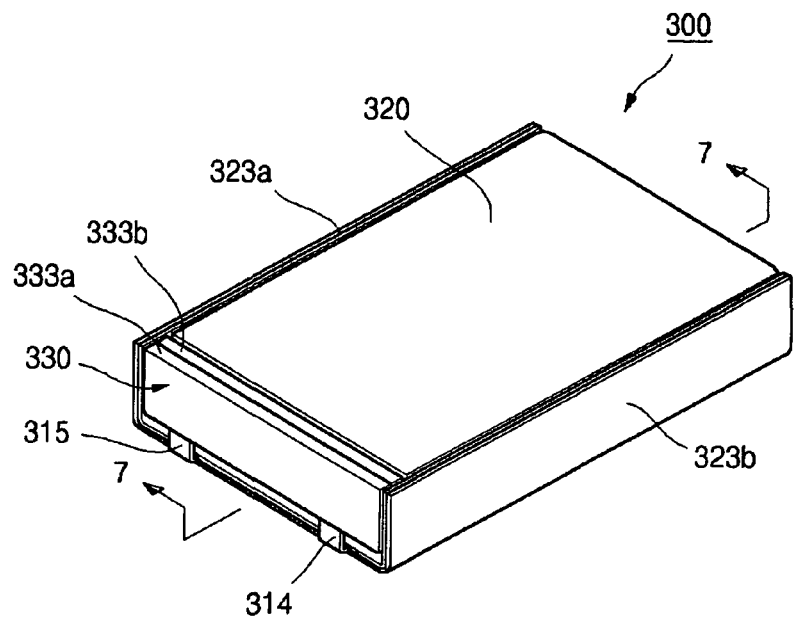
FIG. 7 is a perspective view of a pouch-type lithium polymer battery according to a third embodiment of the present invention.
Figure 8:
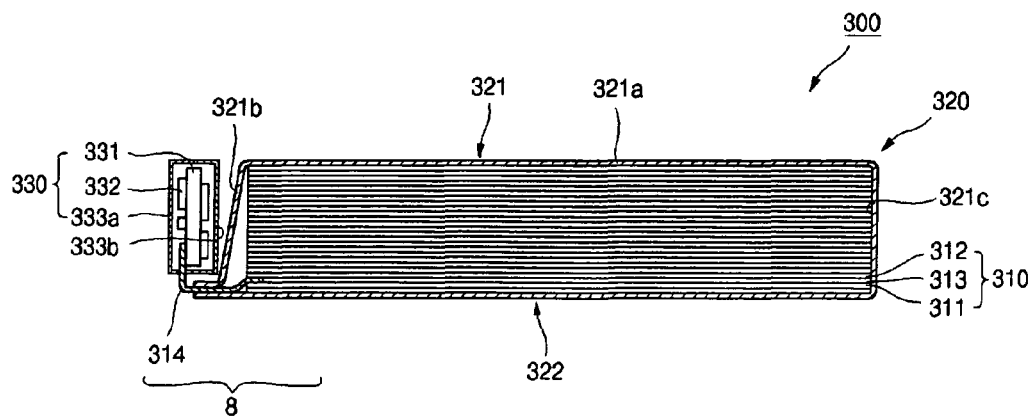
FIG. 8 is a side cross-sectional view of the battery of FIG. 7, taken along line 7-7.
Figure 9:
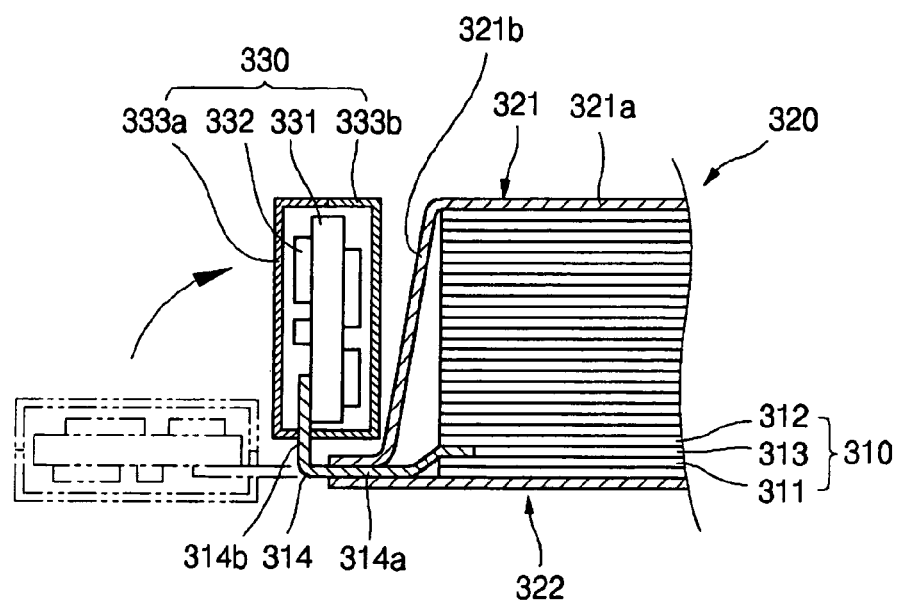
FIG. 9 is a close up side cross-sectional view of region 8 depicted in FIG. 8.

FIGS. 7 through 9 illustrate a pouch-type lithium battery 300 according to a third embodiment of the present invention. Specifically, FIG. 7 is a perspective view of a pouch-type lithium polymer battery 300 according to one embodiment of the present invention. FIG. 8 is a side cross-sectional view of the battery of FIG. 7 taken along line 7-7. FIG. 9 is a close up side cross-sectional view of region 8 depicted in FIG. 8.

The pouch-type lithium polymer battery 300 illustrated in FIGS. 7 through 9 is similar to the above-mentioned pouch-type lithium polymer battery 100 illustrated in FIGS. 1 through 3. Accordingly, only the differences between the batteries are described.

As shown in FIGS. 7 through 9, a protective circuit construction 330 comprises a protective circuit module 331 connected to positive and negative electrode tabs 314 and 315, respectively. The protective circuit module 331 and the positive and negative electrode tabs 314 and 315, respectively, are enclosed in first and second cases 333a and 333b, respectively. The first and second cases 333a and 333b may comprise a resin. The first and second cases 333a and 333b, respectively, are connected to each other by heat, ultrasonic waves, or laser. The protective circuit module 331 is connected to the positive and negative electrode tabs 314 and 315, respectively. Portions of the positive and negative electrode tabs 314 and 315, respectively, are exposed to the exteriors of the first and second cases 333a and 333b, respectively.

In contrast to other embodiments of the present invention, the protective circuit module 331 of the pouch-type lithium polymer battery 300 according to this embodiment does not need to be molded with a resin. Rather, the protective circuit construction 330 is prepared by first forming first and second cases 333a and 333b, respectively. These first and second cases 333a and 333b, respectively, are sized to contain the protective circuit module 331. The protective circuit module 331 is then placed in the first and second cases 333a and 333b, respectively, and the first and second cases 333a and 333b, respectively, are then connected together. Accordingly, unlike the above described embodiments, this embodiment requires no molds or other additional equipment.

Figure 10A:
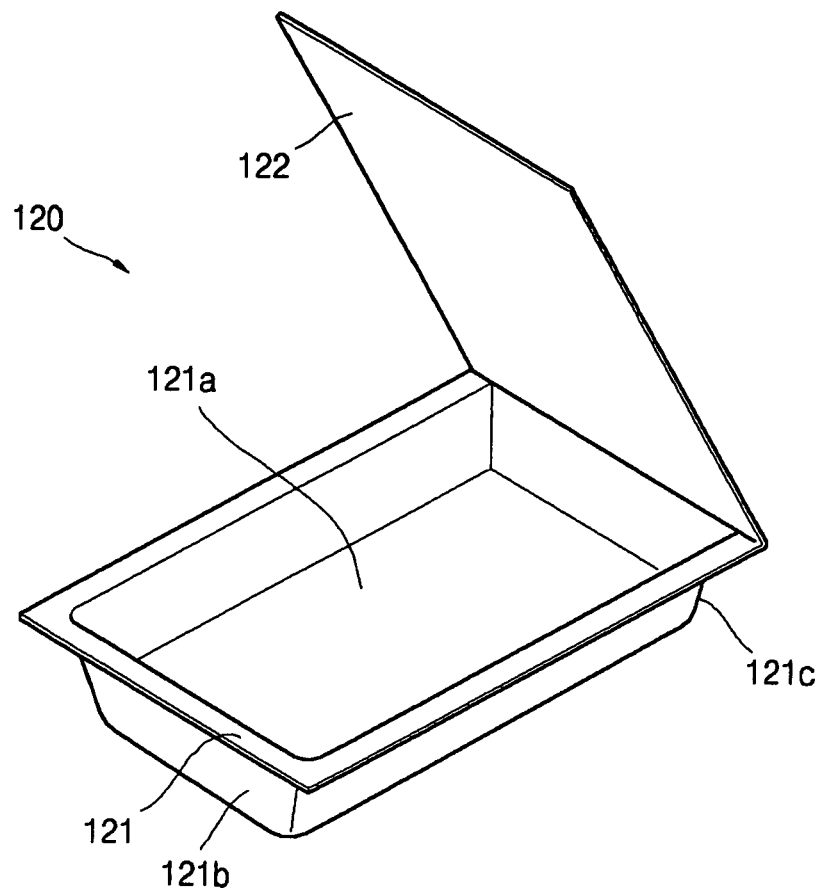
FIG. 10A is a perspective view of a pouch according to one embodiment of the present invention.
Figure 10B:
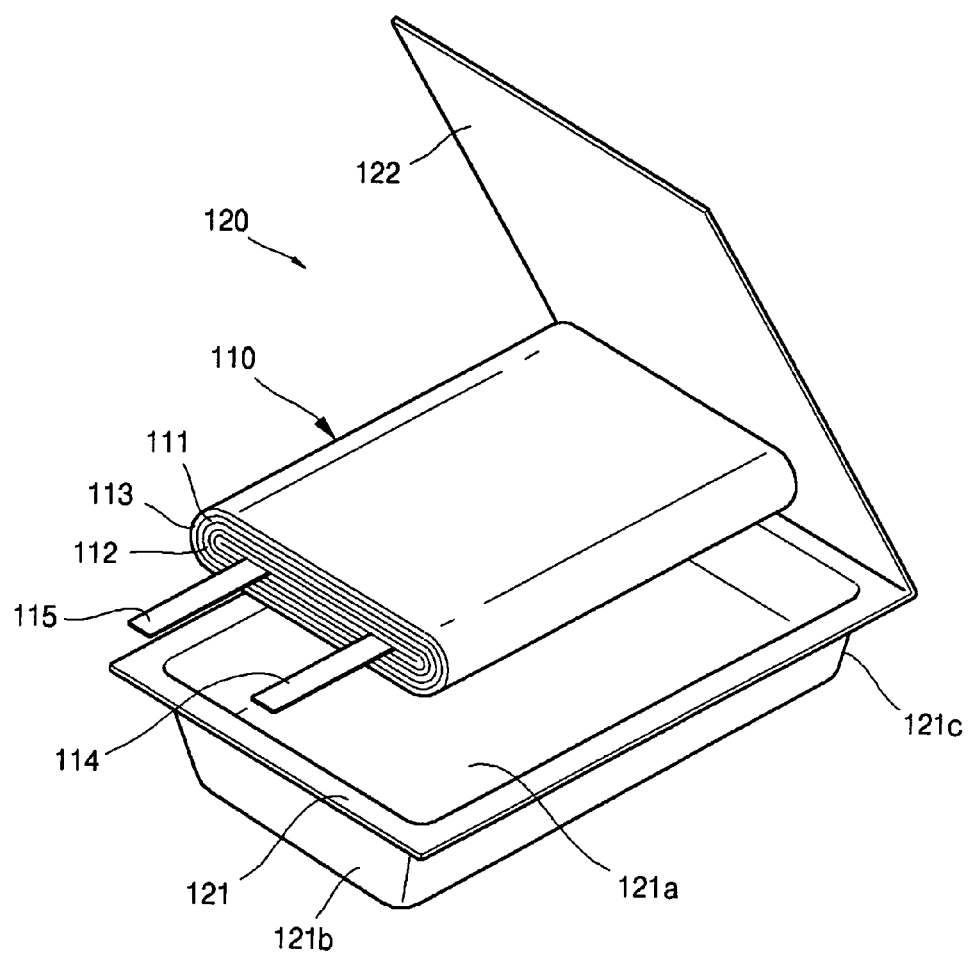
Figure 10C:
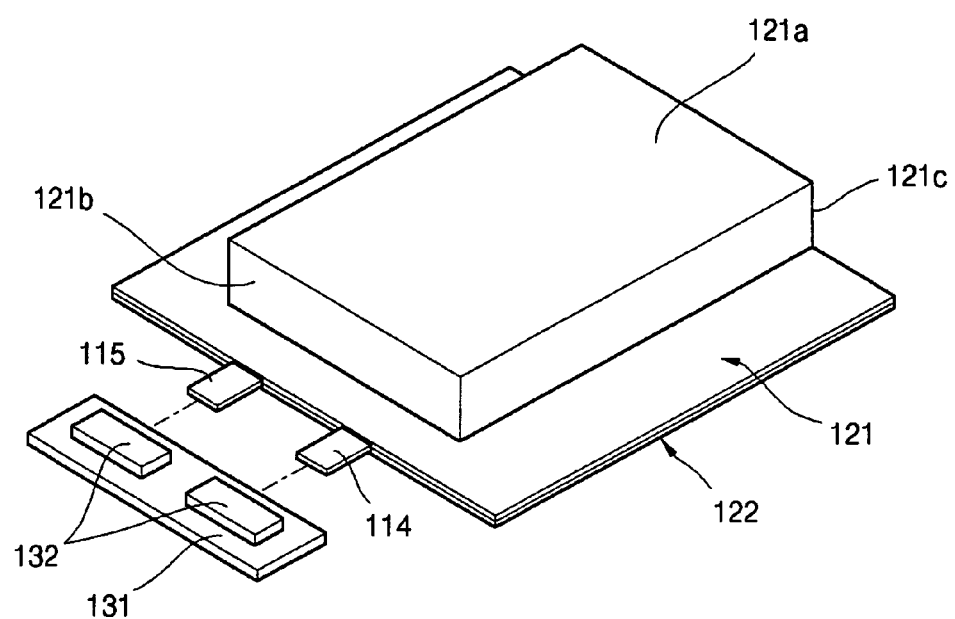
FIG. 10C is a schematic depicting the connection of a protective circuit module to a sealed pouch according to one embodiment of the present invention.
Figure 10D:
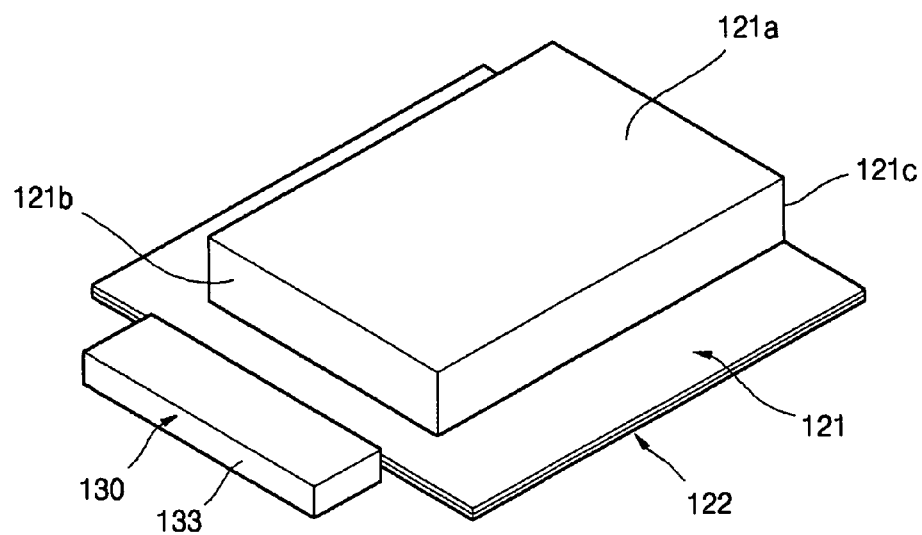
FIG. 10D is a perspective view of a pouch having a connected protective circuit module, shown in an inverted configuration, according to one embodiment of the present invention.
Figure 10E:
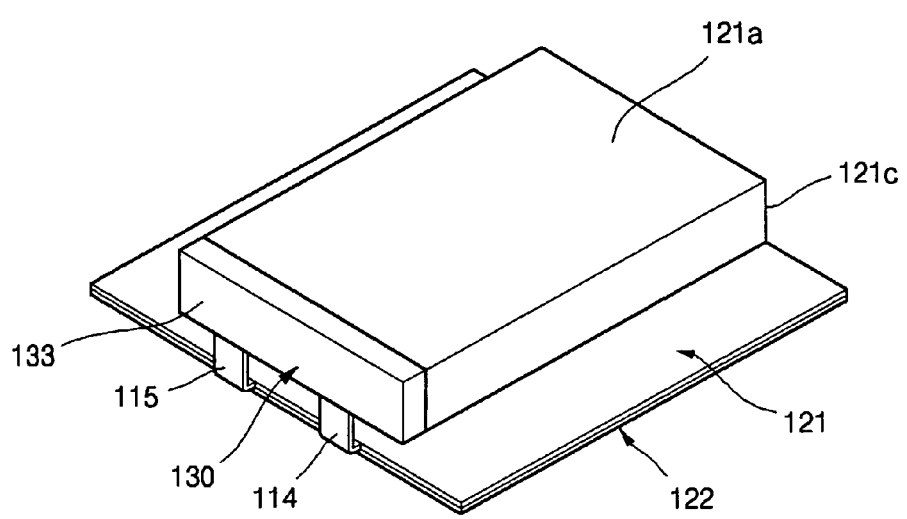
FIG. 10E is a perspective view of the pouch and protective circuit module of FIG. 10d shown in an inverted configuration.
Figure 10F:
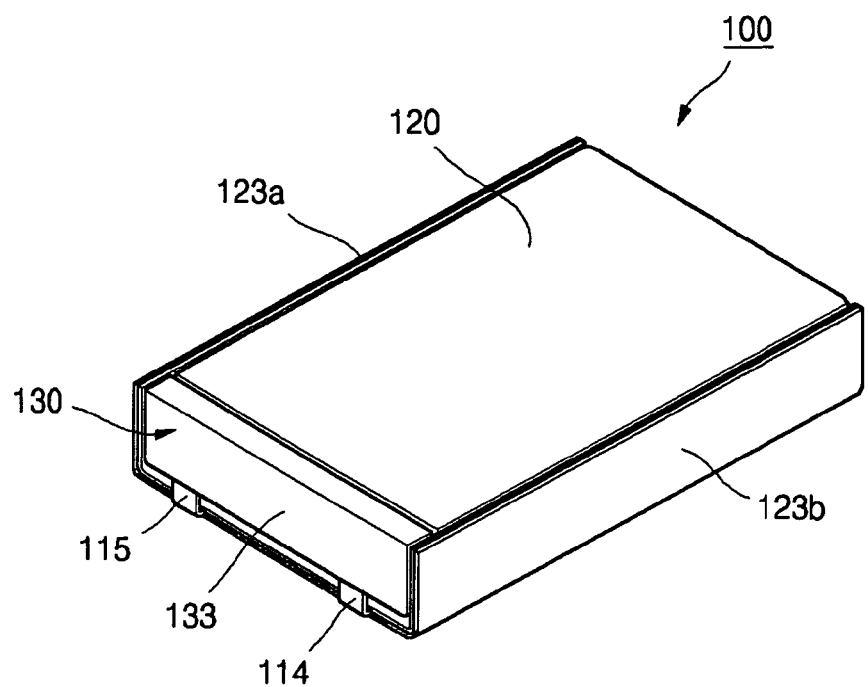
FIG. 10F is a perspective view of a sealed pouch having a connected protective circuit module according to one embodiment of the present invention.

FIGS. 10a through 10f illustrate various processing steps of one embodiment of a method for manufacturing the pouch-type lithium polymer battery 100 according to the embodiment illustrated in FIGS. 1 through 3. As shown in FIG. 10a, the method for manufacturing the pouch-type lithium polymer battery 100 comprises first preparing a pouch 120. Then, as shown in FIG. 10b, an electrode assembly 110 having positive and negative electrode tabs 114 and 115, respectively, is placed in the pouch 120. The pouch 120 is then sealed, and a protective circuit module 131 is connected to the positive and negative electrode tabs 114 and 115, respectively, as shown in FIG. 10c. The protective circuit module 131 is then molded with a resin 133 to form a protective circuit construction 130, as shown in FIG. 10d. Then, as shown in FIG. 10e, the positive and negative electrode tabs 114 and 115, respectively, are bent such that the protective circuit construction 130 is positioned in front of the pouch 120 in an upright position. Lips 123a and 123b, which extend from the outer peripheral edges of the cavity 121 of the pouch 120, are then folded toward the bottom surface 121a of the cavity 121 of the pouch 120, as shown in FIG. 10f.

To prepare the pouch 120, a cavity 121 is first formed. A cover 122 having a surface area adapted to cover the cavity is then formed. The cavity 121 and the cover 122 are adapted to be folded together while maintaining a predetermined depth, as shown in FIG. 10a. The cavity 121 is formed by forming a bottom surface 121a, a front surface 121b and a rear surface 121c.

To encase and seal the electrode assembly 110 in the pouch 120, the electrode assembly 110, including the positive and negative electrode tabs 114 and 115, respectively, are placed in the cavity 121 of the pouch 120. Specifically, the electrode assembly 110 rests in the pouch 120 such that the positive and negative electrode tabs 114 and 115, respectively, extend from the pouch 120 between the cavity 121 and the cover 122. Once the electrode assembly 110 is positioned in the cavity 121, the pouch is then sealed, as shown in FIG. 10b.

The electrode assembly 110 is formed by laminating and then winding the positive and negative electrode plates 111 and 112, respectively, and the separator 113. The positive and negative electrode tabs 114 and 115, respectively, are connected to the positive and negative electrode plates 111 and 112, respectively. The positive and negative electrode tabs 114 and 115, respectively, extend a predetermined length from the exterior of the pouch 120. After encasing the electrode assembly 110 in the pouch 120, the cavity 121 and cover 122 of the pouch are thermally welded together to form a complete seal. The positive and negative electrode tabs 114 and 115, respectively, extend a predetermined length from the exterior of the sealed pouch 120.

To connect the protective circuit module 131 to the pouch 120, the protective circuit module 131 is electrically connected to the positive and negative electrode tabs 114 and 115, respectively, as shown in FIG. 10c, which shows the lithium polymer battery in an inverted configuration relative to FIGS. 10a and 10b. At least one semiconductor device 132 is mounted on the protective circuit module 131 to sense voltages and currents during overcharging, over-discharging, short circuits and the like. Furthermore, at least one wiring pattern (not shown) is formed on the protective circuit module 131.

This unprotected protective circuit module 131 can short-circuit to the circuit of an external apparatus. Therefore, the protective circuit module 131 is molded with a resin 133 to form a protective circuit construction 130, as shown in FIG. 10d. Specifically, the protective circuit module 131 is molded with a resin such that the semiconductor devices 132 and the wiring patterns of the protective circuit module 131 are not exposed. The protective circuit module can be molded by positioning the protective circuit module 131 in a mold having a predetermined shape and filling the mold with resin. Alternatively, the protective circuit module 131 may be coated with the resin. The positive and negative electrode tabs 114 and 115, respectively, which are electrically connected to the protective circuit module 131, are not molded with the resin and instead remain exposed.

In one embodiment, the resin may comprise a high temperature, high pressure resin. Alternatively, the resin may comprise a resin which hardens when exposed to air.

The positive and negative electrode tabs 114 and 115, respectively, are each bent to approximately a "L" or "U" shape, as shown in FIG. 10e. Bending the electrode tabs in this manner positions the protective circuit construction 130 approximately parallel to the front surface 121b of the cavity 121 of the pouch 120.

The protective circuit construction 130 has a thickness less than or equal to the combined thickness of the cavity 121 and cover 122 of the pouch 120. If the thickness of the protective circuit construction 130 is larger than the combined thickness of the cavity 121 and cover 122 of the pouch 120, battery handling in automated processes becomes difficult.

The lips 123a and 123b, which extend from the outer peripheral edges of the cavity 121, are folded toward the bottom surface 121a of the cavity 121, as shown in FIG. 10f. Folding the lips 123a and 123b in this manner prevents the metallic foil of the pouch 120 from short-circuiting to the circuit of an external apparatus.

Figure 11A:
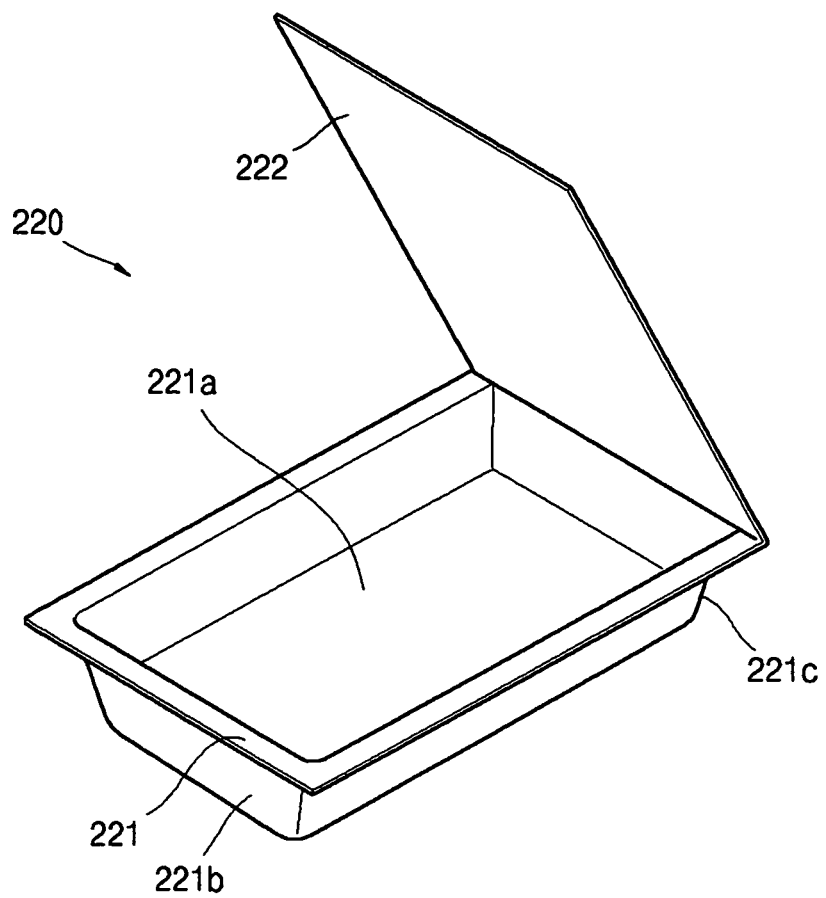
FIG. 11A is a perspective view of a pouch according to one embodiment of the present invention.
Figure 11B:
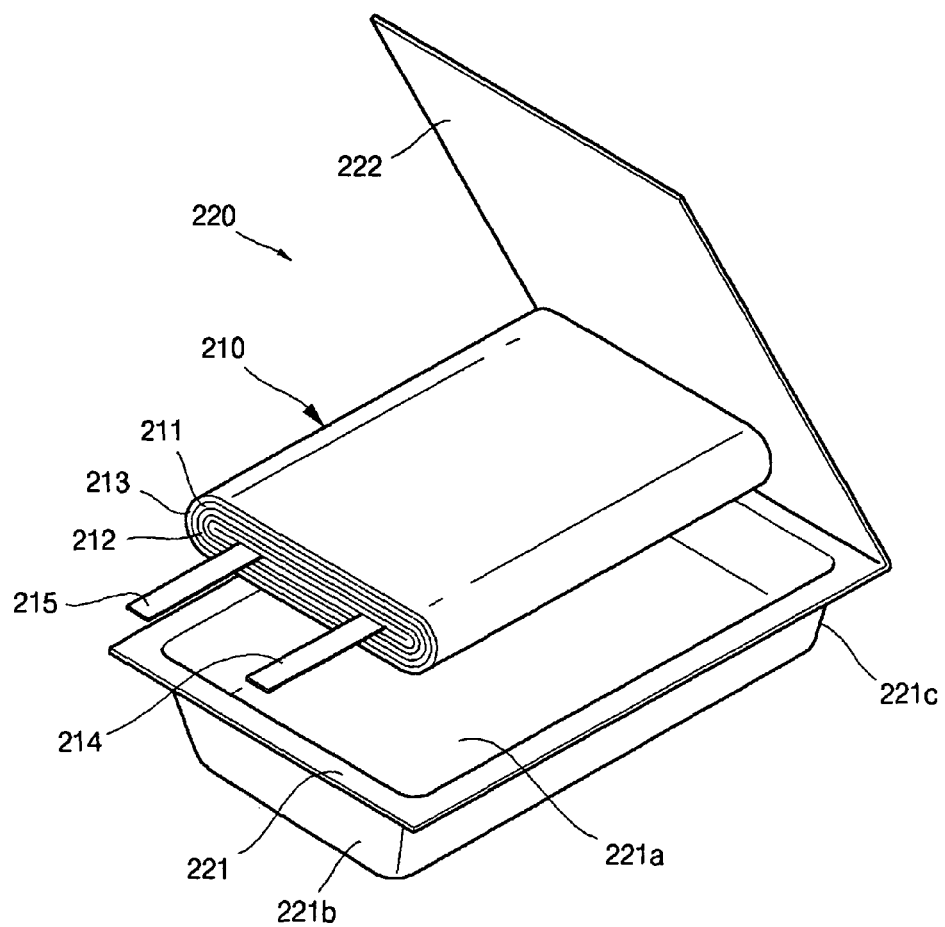
Figure 11C:
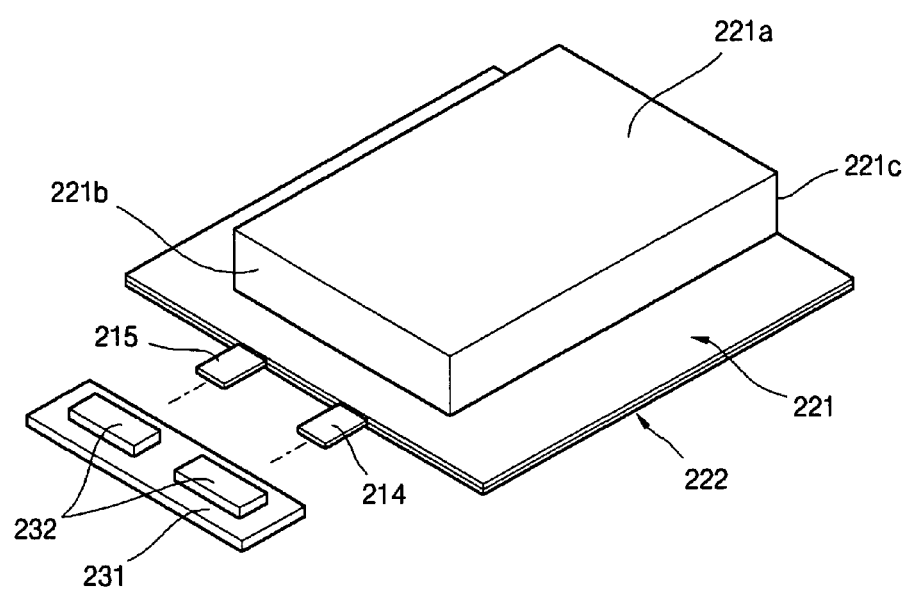
FIG. 11C is a schematic depicting the connection of a protective circuit module to a sealed pouch according to one embodiment of the present invention.
Figure 11D:
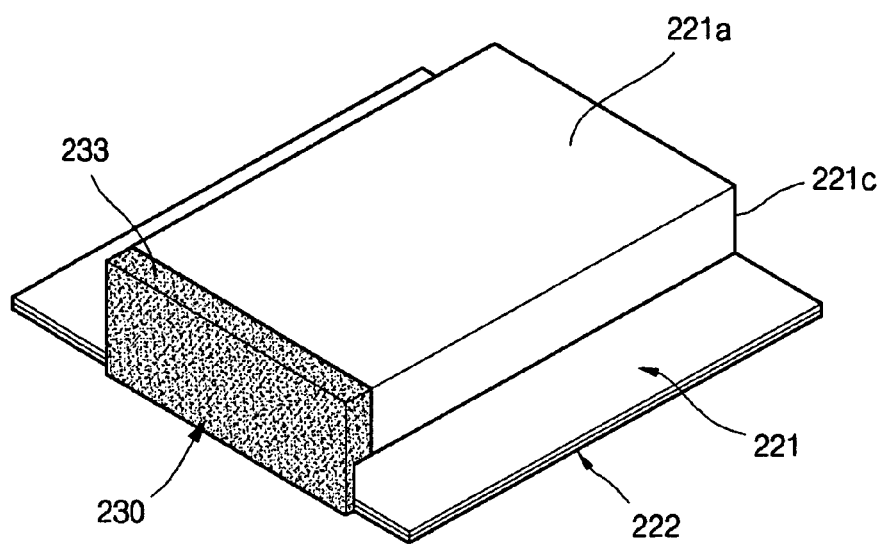
FIG. 11D is a perspective view of a pouch having a connected protective circuit module, shown in an inverted configuration, according to one embodiment of the present invention.
Figure 11E:
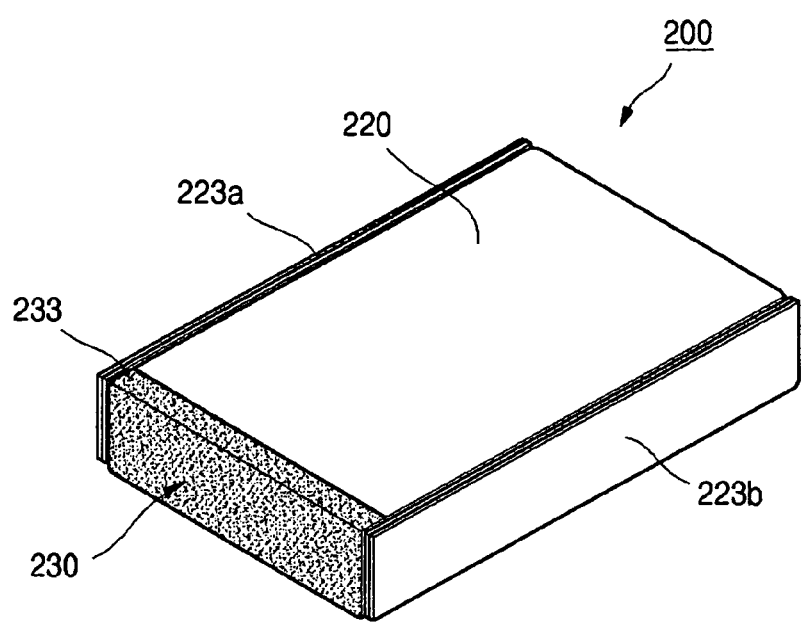
FIG. 11E is a perspective view of a sealed pouch having a connected protective circuit module according to one embodiment of the present invention.

FIGS. 11a through 11e illustrate various processing steps of one embodiment of a method for manufacturing the pouch-type lithium polymer battery 200 according to the embodiment illustrated in FIGS. 4 through 6. As shown in FIG. 11a, the method for manufacturing the pouch-type lithium polymer battery 200 comprises first preparing a pouch 220. Then, as shown in FIG. 11b, an electrode assembly 210 having positive and negative electrode tabs 214 and 215, respectively, is placed in the pouch 220. The pouch 220 is then sealed, and a protective circuit module 231 is connected to the positive and negative electrode tabs 214 and 215, respectively, as shown in FIG. 11c. Then, as shown in FIG. 11d, the positive and negative electrode tabs 214 and 215, respectively, are bent such that the protective circuit construction is positioned in front of the pouch 220 in an upright position. The protective module 231 is then molded with a resin 233 to form a protective circuit construction 230, as also shown in FIG. 11d. Lips 223a and 223b, which extend from the outer peripheral edges of the cavity 221 of the pouch 220, are then folded toward the bottom surface 221a of the cavity 221 of the pouch 220, as shown in FIG. 11e. Preparing the pouch 220, encasing and sealing the electrode assembly 210, connecting the protective circuit module 231 to the positive and negative electrode tabs 214 and 215, respectively, and folding the lips 223a and 223b are carried out in the same manner as the corresponding steps of the method described above, and illustrated in FIGS. 10a through 10f, for manufacturing the battery 100 illustrated in FIGS. 1 through 3. Because these steps are described above, they will not be described again here.

However, the bending of the positive and negative electrode tabs 214 and 215, respectively, and the molding of the protective circuit module 231 and positive and negative electrode tabs 214 and 215, respectively, together with a resin 233 to form a protective circuit construction 230 differ slightly from the method described above. In particular, as shown in FIGS. 11c and 11d, the protective circuit module 231 is connected to the positive and negative electrode tabs 214 and 215, respectively. The positive and negative electrode tabs 214 and 215, respectively, are each then bent to approximately a "L" or a "U" shape. As a result, the protective circuit module 231 is positioned in an upright position in front of the front surface 221b of the cavity 221 of the pouch 220. The protective circuit module 231 and the positive and negative electrode tabs 214 and 215, respectively, are then molded together with a resin 233 such that a portion of the resin 233 adheres to the front surface 221b of the cavity 221 of the pouch.

The protective circuit construction 230 is glued or otherwise fixedly attached to the front surface 221b of the cavity 221 of the pouch 220. Because the resin 233 of the protective circuit construction 230 is fixedly attached to the front surface 221b of the cavity 221, the protective circuit construction 230 cannot easily separate from the pouch 220.

Figure 12A:
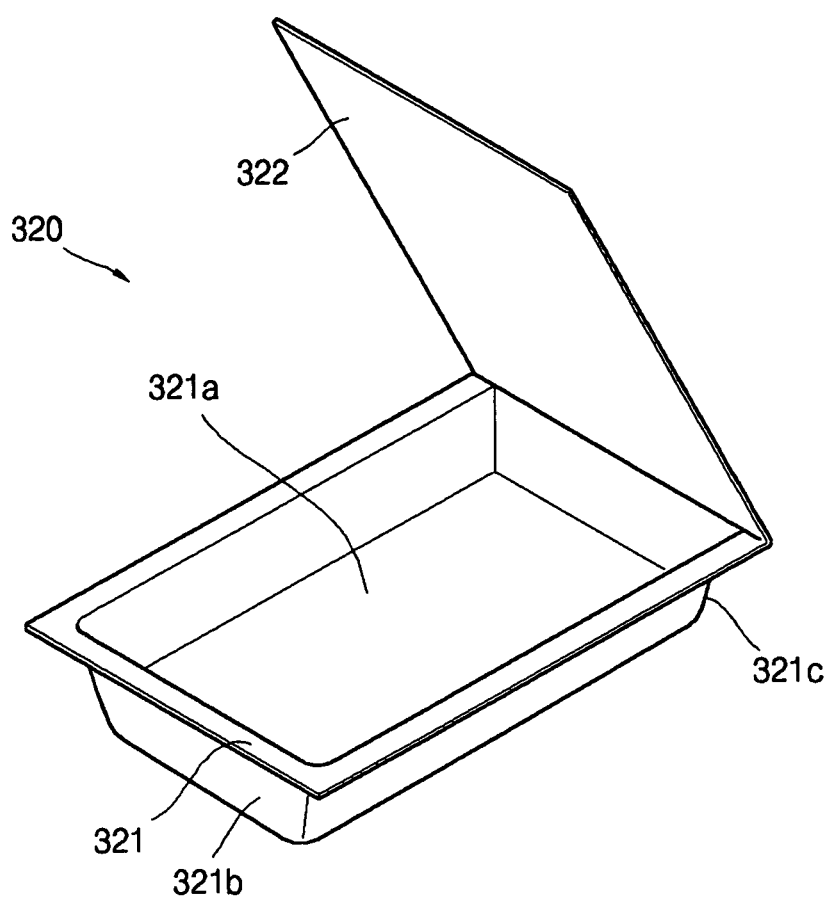
FIG. 12A is a perspective view of a pouch according to one embodiment of the present invention.
Figure 12B:
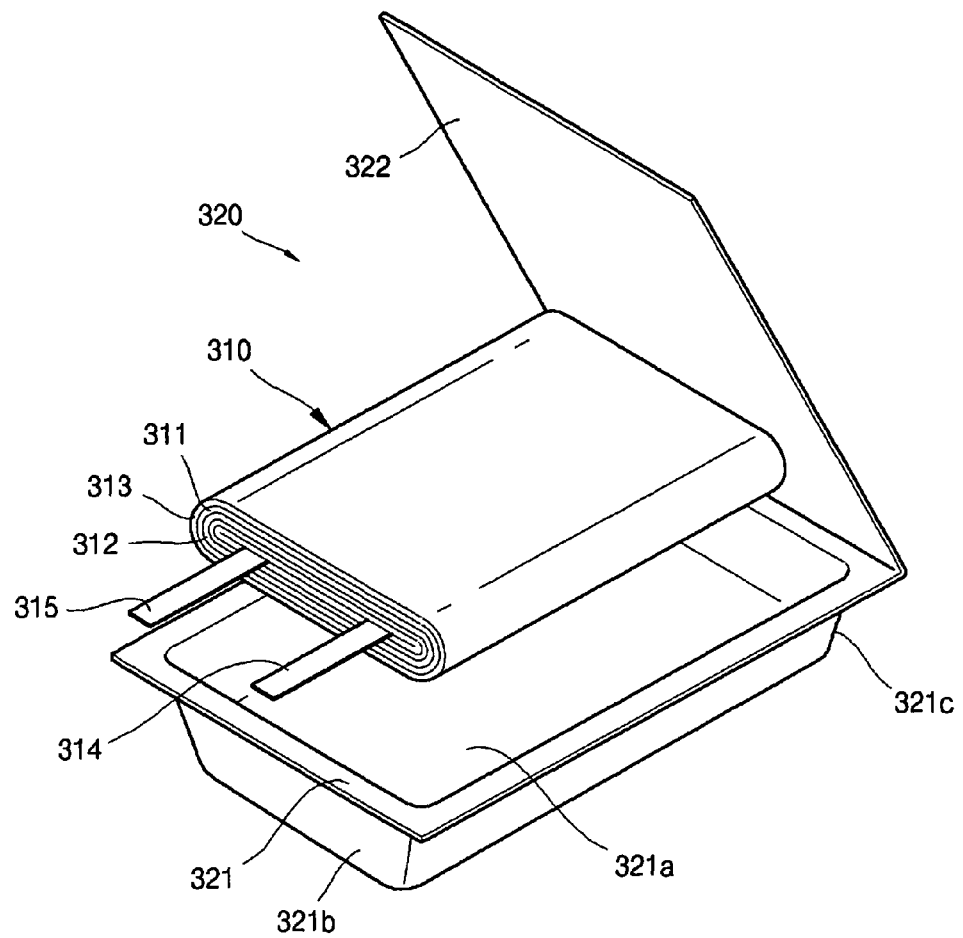
Figure 12C:
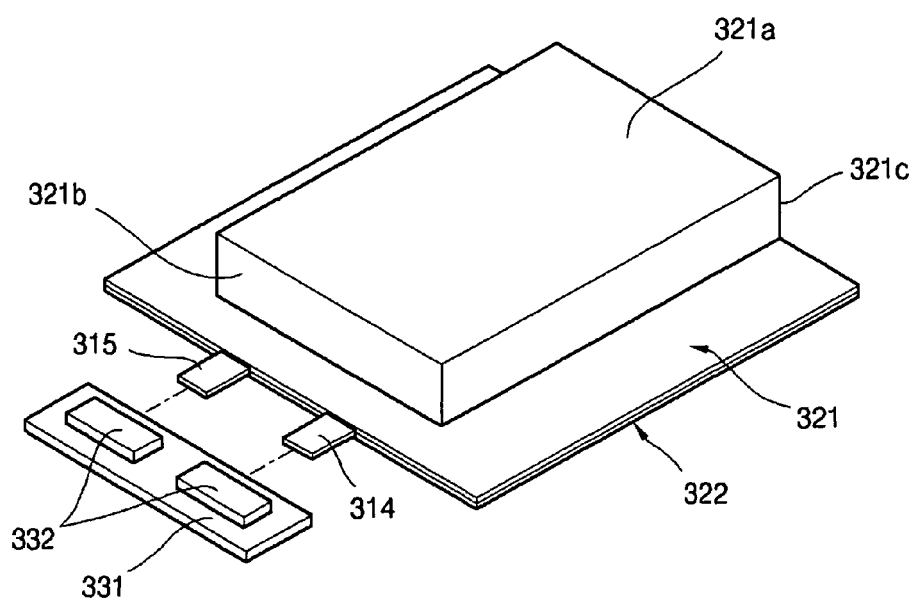
FIG. 12C is a schematic depicting the connection of a protective circuit module to a sealed pouch according to one embodiment of the present invention.
Figure 12D:
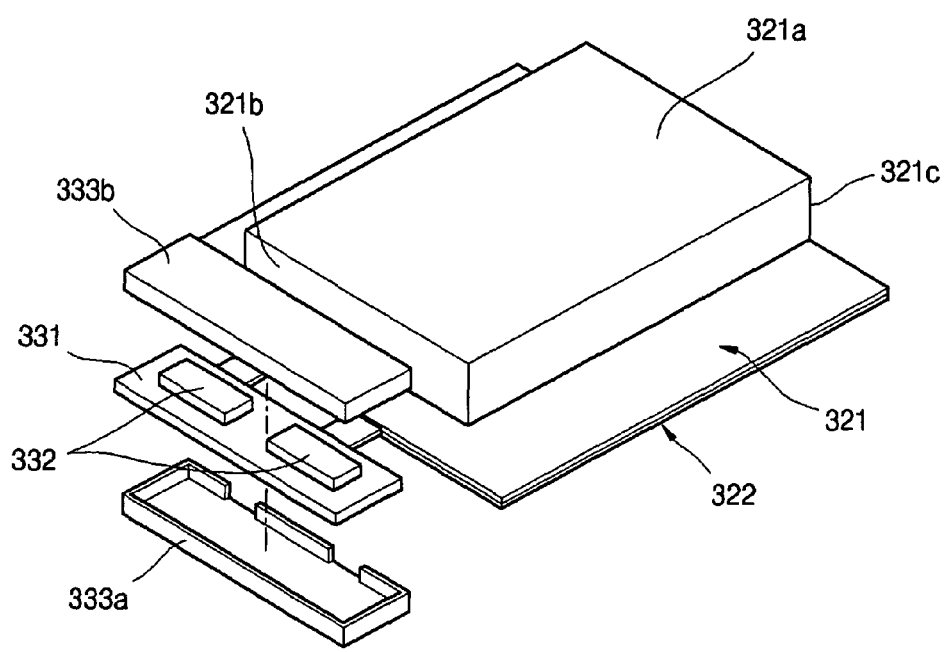
FIG. 12D is a schematic depicting the enclosure of a protective circuit module in a case and the connection of the protective circuit module to a pouch according to one embodiment of the present invention.
Figure 12E:
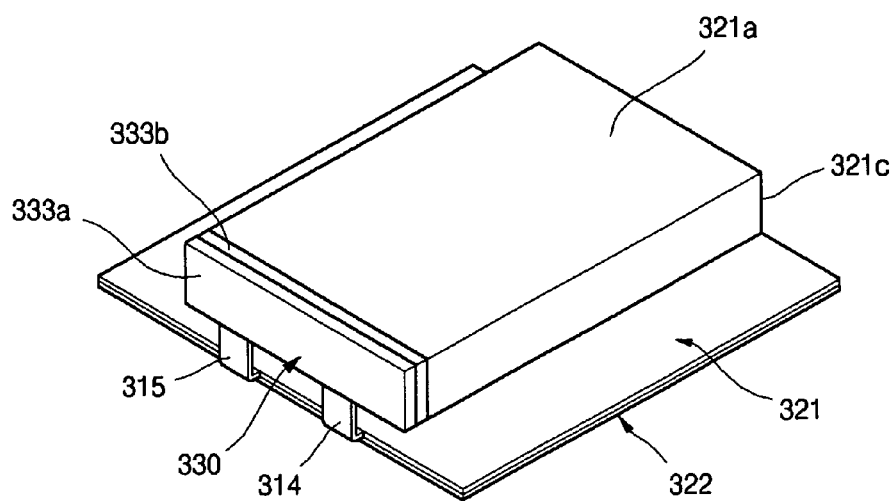
FIG. 12E is a perspective view of the pouch and protective circuit module of FIG. 12d shown in an inverted configuration.
Figure 12F:
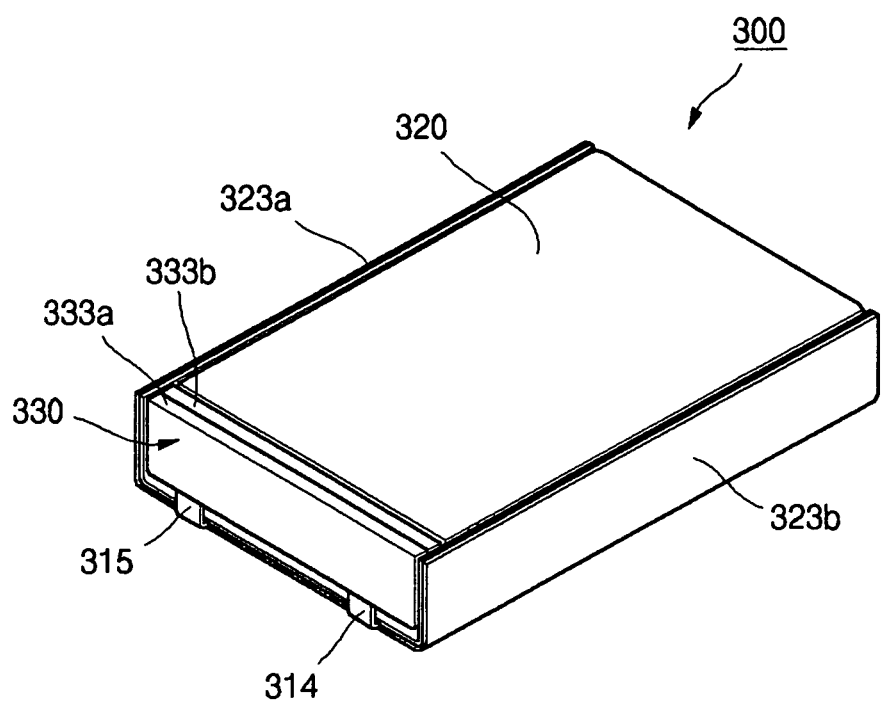
FIG. 12F is a perspective view of a sealed pouch having a connected protective circuit module according to one embodiment of the present invention.

FIGS. 12a through 12f illustrate various processing steps for one embodiment of a method for manufacturing the pouch-type lithium polymer battery 300 according to the embodiment illustrated in FIGS. 7 through 9. As shown in FIG. 12a, the method for manufacturing the pouch-type lithium polymer battery 300 comprises first preparing a pouch 320. Then, as shown in FIG. 12b, an electrode assembly 310 having positive and negative electrode tabs 314 and 315, respectively, is placed in the pouch 320. The pouch 320 is then sealed, and a protective circuit module 331 is connected to the positive and negative electrode tabs 314 and 315, respectively, as shown in FIG. 12c. The protective circuit module 331 is then encased within first and second cases 333a and 333b, respectively, to form a protective circuit construction 330, as shown in FIG. 12d. Then, as shown in FIG. 12e, the positive and negative electrode tabs 314 and 315, respectively, are bent such that the protective circuit construction 330 is positioned in front of the pouch 320 in an upright position. Lips 323a and 323b, which extend from the outer peripheral edges of the cavity 321 of the pouch 320, are then folded toward the bottom surface 321a of the cavity 321 of the pouch 320, as shown in FIG. 12f. Preparing the pouch 320, encasing and sealing the electrode assembly 310, connecting the protective circuit module 331 to the positive and negative electrode tabs 314 and 315, respectively, and folding the lips 323a and 323b are carried out in the same manner as the corresponding steps of the method described above, and illustrated in FIGS. 10a through 10f, for manufacturing the battery 100 illustrated in FIGS. 1 through 3. Because these steps are described above, they will not be described again here.

However, forming the protective circuit construction 330 differs slightly from the method described above. In particular, the protective circuit module 331 is connected to the positive and negative electrode tabs 314 and 315, respectively, and is then placed inside first and second cases 333a and 333b, respectively. The first and second cases 333a and 333b, respectively, are then welded together by thermal bonding, ultrasonic waves, laser, or the like. Welding the first and second cases 333a and 333b together prevents the protective circuit module 331 from escaping the cases. The positive and negative electrode tabs 314 and 315, respectively, are each then bent to approximately a "L" or "U" shape to position the protective circuit construction 330 in an upright position in front of the front surface 321b of the cavity 321 of the pouch 320, as shown in FIGS. 12d and 12e. This method constitutes a simplified method of manufacturing the protective circuit construction 330, and is a less costly method than the resin molding methods described above.

The protective circuit constructions used in the present invention, which comprise protective circuit modules molded with, or encased in a resin, prevent the protective circuit module from short-circuiting to other peripheral circuits of an external apparatus.

At least one semiconductor device and/or passive device is mounted on the protective circuit module, which is then molded with, or encased in a resin. This gives the battery a simplified exterior.

The protective circuit module is connected to the positive and negative electrode tabs, which are each bent to approximately a "L" or "U" shape to position the protective circuit construction in an upright position. As a result, the protective circuit construction can be used in large-capacity lithium polymer batteries without increasing the overall length of the battery.

Furthermore, the process of attaching a tape during packing, which has previously been necessary, can be omitted. This simplifies the overall process, avoids defects, and decreases cost.

Exemplary embodiments of the present invention have been described for illustrative purposes. However, those skilled in the art will appreciate that various modifications, additions and substitutions can be made without departing from the scope and spirit of the invention as disclosed in the accompanying claims.

What is claimed is:

1. A pouch-type lithium polymer battery comprising:
   an electrode assembly comprising:
      a positive electrode plate,
      a positive electrode tab attached to the positive electrode plate,
      a negative electrode plate, a negative electrode tab attached to the negative electrode plate, and a separator positioned between the positive and negative electrode plates;

a pouch for encasing the electrode assembly, the pouch comprising a cavity having a depth and a cover, wherein the positive and negative electrode tabs extend outside the pouch; and a protective circuit construction comprising a protective circuit module directly connected to the positive and negative electrode tabs, and a case external from the pouch comprising a first case part and a second case part affixed to one another, each of the first case part and the second case part comprising resin, wherein the protective circuit module is positioned within the case between the first case part and the second case part such that the entire protective circuit module is completely encased within the resin of the first case part and the second case part, and at least a portion of the case is between the protective circuit module and the pouch, wherein at least a portion of the positive and negative electrode tabs between the connection of the protective circuit module of the protective circuit construction to the positive and negative electrode tabs, and where the positive and negative electrode tabs extend outside of the pouch, are exposed outside of the protective circuit construction and outside of the pouch, defining an exposed portion, and the exposed portion is not covered by resin.

2. A pouch-type lithium polymer battery as claimed in claim 1, wherein the cavity of the pouch comprises a bottom surface and front and rear surfaces approximately perpendicular to the bottom surface, and the protective circuit construction is positioned against the front surface of the cavity.

3. A pouch-type lithium polymer battery as claimed in claim 2, wherein a height of the protective circuit construction is less than or equal to or smaller than a height of the front surface of the cavity.

4. A pouch-type lithium polymer battery as claimed in claim 1, wherein the positive and negative electrode tabs are each bent to approximately a "L" shape to position the protective circuit construction in an upright position in front of the cavity.

5. A pouch-type lithium polymer battery as claimed in claim 1, wherein the positive and negative electrode tabs are each bent to approximately a "U" shape to position the protective circuit construction in an upright position in front of the cavity.

6. A pouch-type lithium polymer battery as claimed in claim 1, wherein the positive and negative electrode tabs each comprise first and second regions, the first region being approximately perpendicular to the second region, and the first region being approximately parallel to the bottom surface of the cavity of the pouch.

7. A pouch-type lithium polymer battery as claimed in claim 1, wherein the first case part and the second case part define a cavity in which the protective circuit module is positioned.

8. A pouch-type lithium polymer battery as claimed in claim 7, wherein the cavity is a rectangular prism shaped cavity.

* * * * *